United States Patent
Srivastava et al.

(10) Patent No.: US 10,657,095 B2
(45) Date of Patent: May 19, 2020

(54) VIRTUALIZING CONNECTION MANAGEMENT FOR VIRTUAL REMOTE DIRECT MEMORY ACCESS (RDMA) DEVICES

(71) Applicant: VMware, Inc., Palo Alto, CA (US)

(72) Inventors: Abhishek Srivastava, Sunnyvale, CA (US); Bryan Tan, Mountain View, CA (US); Aditya Sarwade, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 110 days.

(21) Appl. No.: 15/704,278

(22) Filed: Sep. 14, 2017

(65) Prior Publication Data
US 2019/0079896 A1    Mar. 14, 2019

(51) Int. Cl.
| | |
|---|---|
| G06F 15/173 | (2006.01) |
| G06F 9/455 | (2018.01) |
| G06F 15/167 | (2006.01) |
| G06F 9/54 | (2006.01) |

(52) U.S. Cl.
CPC .... G06F 15/17331 (2013.01); G06F 9/45558 (2013.01); G06F 9/547 (2013.01); G06F 15/167 (2013.01); G06F 2009/45583 (2013.01); G06F 2009/45595 (2013.01)

(58) Field of Classification Search
CPC ........... G06F 15/17331; G06F 9/45558; G06F 15/167; G06F 2009/45583; G06F 2009/45595
See application file for complete search history.

(56) References Cited

U.S. PATENT DOCUMENTS

| | | | | |
|---|---|---|---|---|
| 2002/0073257 | A1* | 6/2002 | Beukema | H04L 12/4633 710/105 |
| 2002/0078265 | A1* | 6/2002 | Frazier | H04L 29/06 710/4 |
| 2014/0297775 | A1* | 10/2014 | Davda | G06F 13/28 709/212 |
| 2016/0026605 | A1* | 1/2016 | Pandit | G06F 15/17 709/212 |
| 2016/0188527 | A1* | 6/2016 | Cherian | H04L 45/74 709/212 |
| 2016/0239323 | A1* | 8/2016 | Tsirkin | G06F 9/45558 |
| 2016/0267052 | A1* | 9/2016 | Metzler | G06F 15/17331 |
| 2018/0004705 | A1* | 1/2018 | Menachem | G06F 15/17331 |

* cited by examiner

Primary Examiner — Michael A Keller (57) ABSTRACT

Described herein are systems, methods, and software to enhance virtualization connection management for virtual remote direct memory access (RDMA) devices. In one implementation, virtual machines may register with a hypervisor for the virtual machines, wherein the registration for each virtual machine includes at least one address for the virtual machine. Once registered, the hypervisor may identify a packet placed in a queue pair from a physical RDMA interface and determine whether a destination address in the packet corresponds to a virtual machine. If the destination address corresponds to a virtual machine, then the hypervisor may provide a callback to the virtual machine, wherein the callback provides access to the packet in the virtual machine as if the packet received at a virtual RDMA interface of the virtual machine.

18 Claims, 8 Drawing Sheets

VIRTUALIZING CONNECTION MANAGEMENT FOR VIRTUAL REMOTE DIRECT MEMORY ACCESS (RDMA) DEVICES

BACKGROUND

Remote direct memory access (RDMA) is a direct memory access from the memory of one computer into that of another without using the operating systems of the computing systems. This memory access operation may be used in a computing environment to provide a high-throughput, low-latency network, which can be useful in clustered computing environments where multiple systems may frequently share data for processing. To provide the connections between the two systems, RDMA may use control or management channels and what are known as queue pairs to request and configure the necessary channels for the communications. For example, an application on the first computing system may post a first request in the queue pair to write data to the second computing system. Once posted, a request may be delivered from the first computing system to the second computing system to initiate the configuration of data channels for the communication.

However, although RDMA is useful in communicating data between two physical computing systems, difficulties arise when virtual machines attempt to leverage the operations of RDMA. In particular, when RDMA packets are received at a queue pair for a host computing system that is required to be shared by the virtual machines, the host computing system may have difficulty in forwarding the packets to the corresponding virtual machine. Further, the host computing systems may have difficulty in managing the outgoing RDMA packets from the virtual machines when the virtual machines are required to share a queue pair.

OVERVIEW

The technology disclosed herein enhances virtualization connection management for virtual remote direct memory access (RDMA) devices. In one implementation, a method of managing packets identified in a queue pair for a physical RDMA interface of a host computing system includes obtaining one or more RDMA registrations each corresponding to a virtual machine running on the host computing system, wherein each of the one or more RDMA registrations indicates at least one address for the corresponding virtual machine. The method further includes identifying a packet on the queue pair received at the physical RDMA interface, and identifying whether a destination address for the packet corresponds to a virtual machine on the host computing system based on the one or more RDMA registrations. The method also includes, if the destination address corresponds to a virtual machine on the host computing system, providing a callback for the packet to the virtual machine.

DETAILED DESCRIPTION

The various examples disclosed herein provide enhancements for remote direct memory access (RDMA) communications by virtual machines. In many organizations, virtual machines are deployed on host computing systems to more efficiently use the resources of the host computing system. These virtual machines are often provided with abstracted virtual components via a hypervisor, wherein the components may include processing resources, memory resources, network resources, and the like. In some examples, the virtual machines deployed via the host computing system may be provided with a virtual RDMA interface capable of providing direct memory access to other physical and virtual computing systems.

In supporting the operations of the virtual RDMA interfaces, the hypervisor on the host computing system may manage and forward communications to the required virtual machine. In particular, each of the virtual machines with a virtual RDMA interface may register with the hypervisor, wherein the registration indicates addressing for the virtual machine, such as a media access control (MAC) address for the virtual machine. Once registered, the hypervisor may monitor a management queue pair that is required to be shared by the virtual machines (such as the General Services Interface (GSI) or queue pair 1 (QP1)) for the physical RDMA interface to identify received packets targeted for a virtual machine. When a packet is identified, by inspecting the packets placed in the queue pair, the hypervisor may provide a callback to the corresponding virtual machine, permitting the virtual machine to process the received packet as if it were received locally by the virtual machine. In some implementations, this may include placing the packet in a queue pair for the virtual RDMA interface of the virtual machine. This placing of the packet in queue pair for the virtual machine may include a memory transfer or copy in some examples, wherein the received packet is transferred into the memory of the virtual machine to permit the virtual machine to process the packet.

In addition to providing the support for received packets on the queue pair, the hypervisor may further provide operations to manage packets to be transferred to other physical computing systems from the virtual machines. In particular, when a management packet or management datagram is requested to be transferred by one of the virtual machines, the hypervisor may identify the request and place the packet in the required management queue pair. Once posted, the hypervisor may monitor whether the packet was successful in being transferred to the second computing system, and communicate a notification to the requesting virtual machine indicating whether the transfer of the packet was successful. In this manner, the hypervisor may be used to act as an intermediary between the virtual machine and the physical RDMA interface. Specifically, the hypervisor may be used to manage RDMA packets corresponding to multiple virtual machines and forward the packets as required via a single queue pair.

Figure 1:
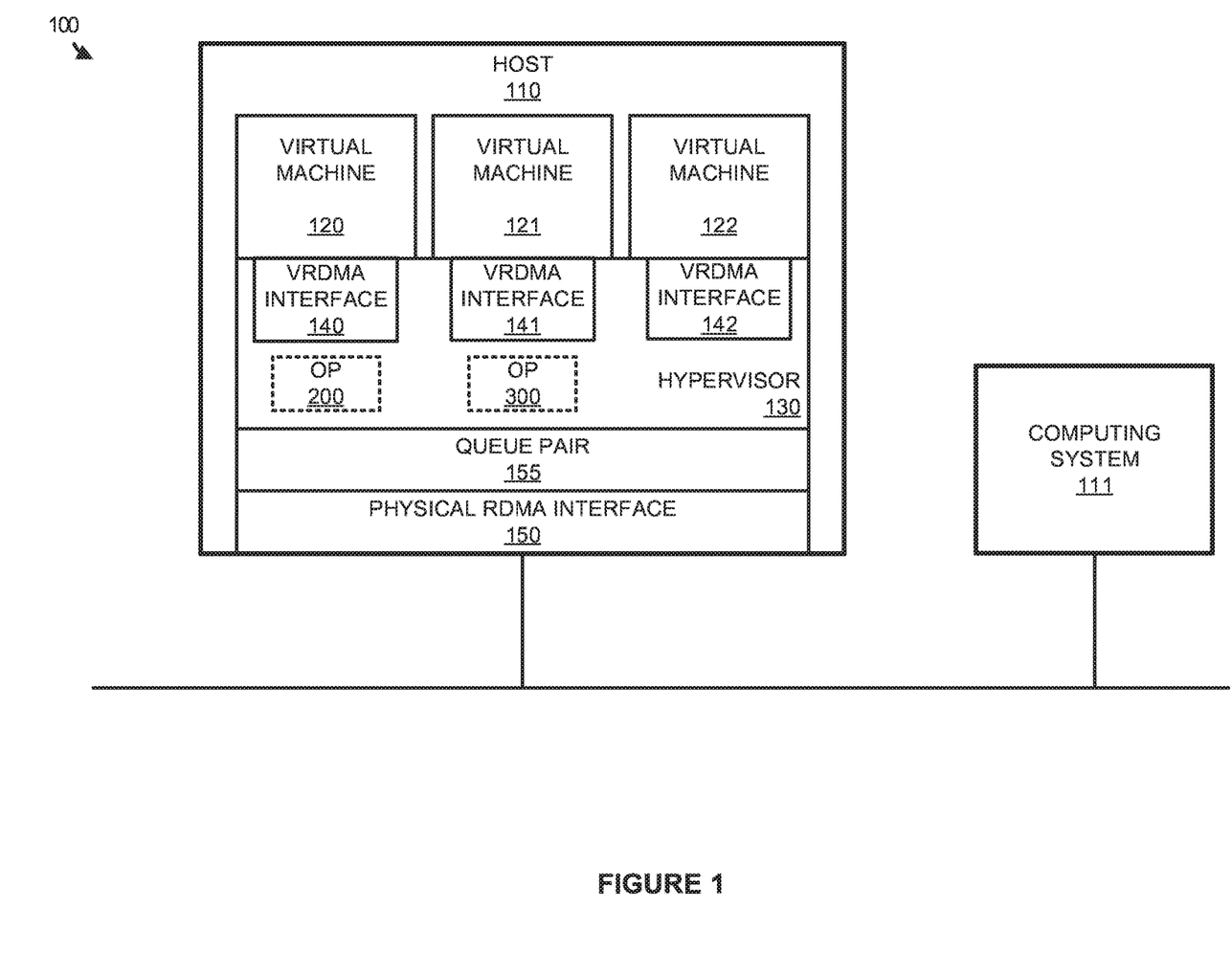
FIG. 1 illustrates a computing environment to exchange remote direct memory access (RDMA) data according to an implementation.

FIG. 1 illustrates a computing environment 100 to exchange remote direct memory access (RDMA) data according to an implementation. Computing environment 100 includes host 110 and computing system 111, which comprise computing systems capable of RDMA communications. Host 110 includes virtual machines 120-122, virtual RDMA (VRDMA) interfaces 140-142, hypervisor 130, queue pair 155, and physical RDMA interface 150. Hypervisor 130 further provides operation 200 further described in FIG. 2, and operation 300 further described in FIG. 3. Computing system 111 may comprise a second host computing system in some implementations, wherein one or more virtual machines may execute via a hypervisor on computing system 111. Although illustrated with three virtual machines in the present implementation, it should be understood that a greater or fewer number of virtual machines may be deployed on a host in some implementations.

In operation, hypervisor 130 provides a platform to execute virtual machines 120-122. To provide this platform, hypervisor 130 may abstract the physical components of host 110 and provide virtualized resources to each of the virtual machines. These resources may include processing systems, communication interfaces, storage systems, or some other similar resource. In the present implementation, hypervisor 130 provides VRDMA interfaces 140-142 to corresponding virtual machines 120-122. These VRDMA interfaces permit the virtual machines to communicate, via direct memory access, with other computing nodes both physical and virtual. For example, if virtual machine 120 were to request a VRDMA communication with virtual machine 122, then hypervisor 130 may support the memory transfer without using the physical RDMA interface 150 and queue pair 155.

Although communications between VRDMA interfaces on the same host computing system may be processed locally using hypervisor 130 without the use of the physical RDMA interface resources, hypervisor 130 may also be responsible for managing and forwarding RDMA packets as they are received via physical RDMA interface 150. In particular, hypervisor 130 may monitor packets as the packets are placed on queue pair 155, which is representative of a RDMA management queue pair such as a GSI queue pair (of which there is only one), that is responsible for managing the RDMA communications between computing systems. These configuration communications may include establishing connections, generating ports for communications, or some other similar management operation for configuring a RDMA communication.

Figure 2:
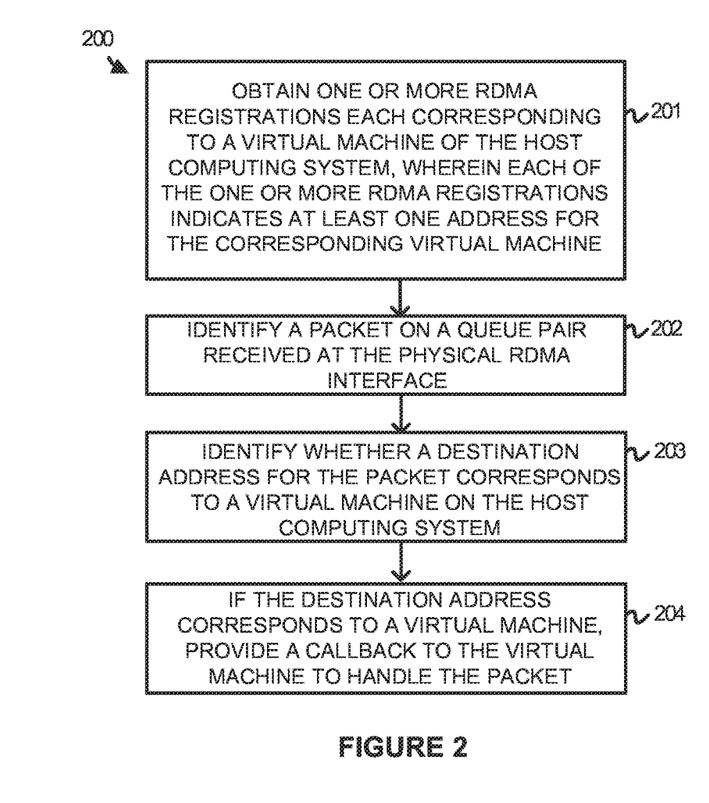
FIG. 2 illustrates an operation of a host computing system to exchange RDMA packets according to an implementation.

FIG. 2 illustrates an operation 200 of a host computing system to exchange RDMA packets according to an implementation. The processes of operation 200 are referenced parenthetically in the paragraphs that follow with reference to systems and elements of computing environment 100 of FIG. 1.

As depicted, operation 200 includes obtaining (201) one or more RDMA registrations each corresponding to a virtual machine running on the host computing system, wherein each of the one or more RDMA registrations indicates at least one address (such as a destination MAC address) for the corresponding virtual machine. Referring to FIG. 1, each virtual machine of virtual machines 120-122 includes a VRDMA interface 140-142. To permit the virtual machines to provide RDMA communications with elements executing outside of host 110, each of the virtual machines are required to register with hypervisor 130, wherein hypervisor 130 may maintain addressing information for each of the virtual machines. Using the present example, hypervisor 130 may maintain a destination MAC address for the virtual machine, however, it should be understood that other addressing information may be maintained in addition to or in place of the MAC addresses.

Once the machines are registered, operation 200 further includes identifying (202) a packet on a GSI queue pair received at the physical RDMA interface. Referring to the example of computing environment 100, when a packet is received at physical RDMA interface 150, the packet may be placed on queue pair 155, wherein queue pair 155 is representative of a GSI or some other similar management queue pair for host 110. This GSI queue pair is used to support management packets that support the handshaking and configuration of data communications between computing systems. For example, a management packet or management datagram (MAD) may be delivered from computing system 111 to configure a communication with one of virtual machines 120-122. Once the packet is received, the packet may be placed within queue pair 155 where the packet may be inspected to determine further operations.

After a packet is identified within queue pair 155, operation 200 further includes identifying (203) whether a destination address for the packet corresponds to a virtual machine on the host computing system based at least on the RDMA registrations from the virtual machines. Referring again to the example of receiving a packet from computing system 111, when the packet is placed in queue pair 155, hypervisor 130 may inspect the packet to determine an action to take with the packet. In particular, when the virtual machines register with hypervisor 130, hypervisor 130 may maintain one or more data structures that relate addresses to their corresponding virtual machines. Consequently, when a packet is identified in queue pair 155, hypervisor 130 may inspect the packet to determine if a destination address of the packet corresponds to a registered virtual machine. If the destination address corresponds to a virtual machine on host 110, operation 200 will provide (204) a callback for the packet to the corresponding virtual machine, wherein the callback permits the virtual machine to access the packet as if the packet were received at the VRDMA interface for the virtual machine (e.g. the packet placed in a queue pair of the virtual machine by performing a memory copy of the packet into the virtual machine memory space). In some examples, once the packet is accessed and processed via the virtual machine a notification may be provided to the hypervisor indicating the process on the packet was complete.

For example, if computing system 111 transferred a management packet or MAD to virtual machine 120, the packet would be received at physical RDMA interface 150 and placed in queue pair 155. Once identified in queue pair 155, hypervisor 130 may inspect the packet to identify a destination MAC address for the packet. Once identified as corresponding to virtual machine 120, virtual machine 120 may be provided with a callback for the packet that permits virtual machine 120 to process the packet as if it were received at VRDMA interface 140. In some implementations, this may include placing the packet in a queue pair for virtual machine 120 via a memory copy and making the required action based on the packet.

Figure 3:
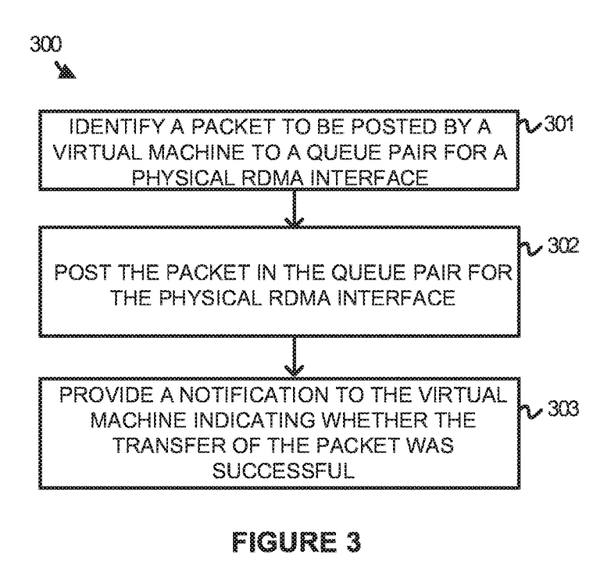
FIG. 3 illustrates an operation of a host computing system to exchange RDMA packets according to an implementation.

FIG. 3 illustrates an operation 300 of a host computing system to exchange RDMA packets according to an implementation. The processes of operation 300 are referenced parenthetically in the paragraphs that follow with reference to systems and elements of computing environment 100 of FIG. 1.

As described previously in FIG. 1, hypervisor 130 is configured to obtain one or more RDMA registrations each corresponding to a virtual machine of the host computing system, wherein each of the one or more RDMA registrations indicates at least one address for the corresponding virtual machine. For example, when virtual machine 120 is initiated on host 110, the virtual machine may provide a registration to the hypervisor indicating a MAC address to be used in conjunction with RDMA communications. After the virtual machines are registered for RDMA communications, operation 300 includes identifying (301) a packet to be posted by a virtual machine to a queue pair for the physical RDMA interface. Returning to the example of virtual machine 120, when virtual machine 120 requires the communication of a management packet over the physical RDMA interface 150, hypervisor 130 may identify the packet, which may comprise a management datagram (MAD), and post (302) the packet in the queue pair for the physical RDMA interface. Once posted, operation 300 further includes providing (303) a notification to the virtual machine indicating whether the transfer of the packet was successful.

Referring again to the example of a management packet being communicated by virtual machine 120. Once the packet is identified and posted (or copied) in queue pair 155, hypervisor 130 may monitor the packet to determine whether the transfer of the packet was successful to the second computing system. Thus, if virtual machine 120 were transferring a management packet to computing system 111, hypervisor 130 may monitor whether the packet transfer was successful, and notify virtual machine 120 indicating whether the transfer was successful. In this manner, operation 300 may be used to transparently communicate packets over physical RDMA interface 150 while making the communication appear as though it were communicated over VRDMA interface 140 for the virtual machine.

Although not depicted in FIGS. 2 and 3, it should be understood that queue pair 155 may only be used for RDMA communications when RDMA is required between physical computing systems. As a result, when virtual machine 120 requests a communication with virtual machine 122, rather than providing the packets to queue pair 155, hypervisor 130 in conjunction with VRDMA interfaces 140 and 142 may be used to provide the requests between the two virtual machines.

Figure 4:
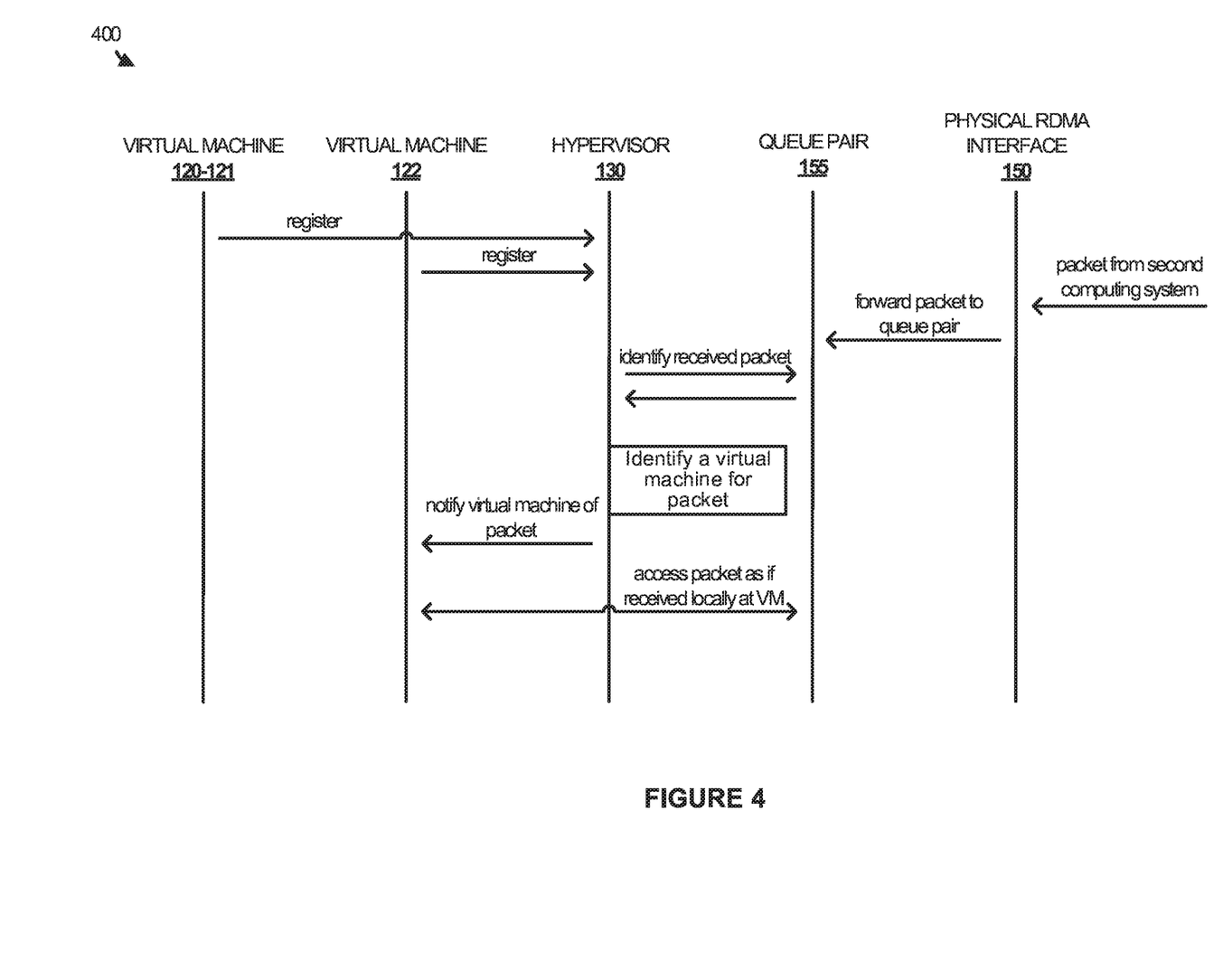
FIG. 4 illustrates a timing diagram for receiving a RDMA packet in a queue pair according to an implementation.

FIG. 4 illustrates a timing diagram 400 for receiving a RDMA packet in a queue pair according to an implementation. Timing diagram 400 includes systems and elements from computing environment 100 of FIG. 1. In particular, timing diagram 400 includes virtual machines 120-122, hypervisor 130, queue pair 155, and physical RDMA interface 150.

In operation, virtual machines 120-122 register with hypervisor 130 to support RDMA communications over physical RDMA interface 150. In registering with hypervisor 130, each of the virtual machines may provide hypervisor 130 with addressing information, such as a MAC address for the virtual machine, wherein the addressing information may be used by hypervisor 130 to identify packets within queue pair 155 that correspond to the virtual machine. For example, when a packet is identified in queue pair 155, hypervisor 130 may perform packet inspection to identify a destination MAC associated with the packet, and forward the packet based on the inspection.

In the present example of timing diagram 400, a packet is received from a second computing system at physical RDMA interface 150 where the packet is then placed in queue pair 155. Queue pair 155 may be representative of a GSI queue pair, which includes a send queue and a receive queue and is used in the management of RDMA communications between computing systems. The packet may comprise a MAD, which is used in establishing and configuring the communication channels between computing systems. Once the packet is stored in queue pair 155, hypervisor 130 may identify the received packet within the receive queue for queue pair 155.

Once the packet is identified within queue pair 155, hypervisor 130 then identifies a virtual machine for the packet. To provide this operation, hypervisor 130 may maintain one or more data structures for identifying the virtual machines that registered for RDMA communications. These data structures may be used in managing the addressing information for each of the virtual machines. As a result, when a packet is identified, hypervisor 130 may perform packet inspection of the packet to identify a destination MAC address for the packet. Once the MAC address is identified for the corresponding virtual machine, hypervisor 130 may notify the virtual machine, in this example virtual machine 122, that a packet has been received, wherein the notification may provide a callback to the packet in queue pair 155.

By providing this callback, virtual machine 122 may identify the packet as though it had been received locally at the VRDMA interface for the virtual machine. In some implementations, this may include making the packet appear as though it was received at a queue pair for the virtual machine, permitting the virtual machine to locally process the packet, or some other similar operation. In processing packet, the packet may include data for establishing channels for communication, taking down channels for communication, or some other similar management packet.

Although the previous example demonstrated providing a packet to the virtual machine when it is received over physical RDMA interface 150, it should be understood that the virtual machines may also perform RDMA communications with other virtual machines on the same host computing system. In particular, rather than identifying a packet within queue pair 155, the hypervisor may identify management packets from the machine via the VRDMA interface for the virtual machine and will forward the packet to the VRDMA interface of the destination virtual machine. Advantageously, the hypervisor may provide software defined networking between virtual machines on the same host computing system. For example, if virtual machine 120 were sending a management packet to virtual machine 122, hypervisor 130 may identify the communication from VRDMA interface 140 and forward the communication to the destination VRDMA interface 142. Thus, the communication may be implemented without the use of queue pair 155 for physical RDMA interface 150.

Figure 5:
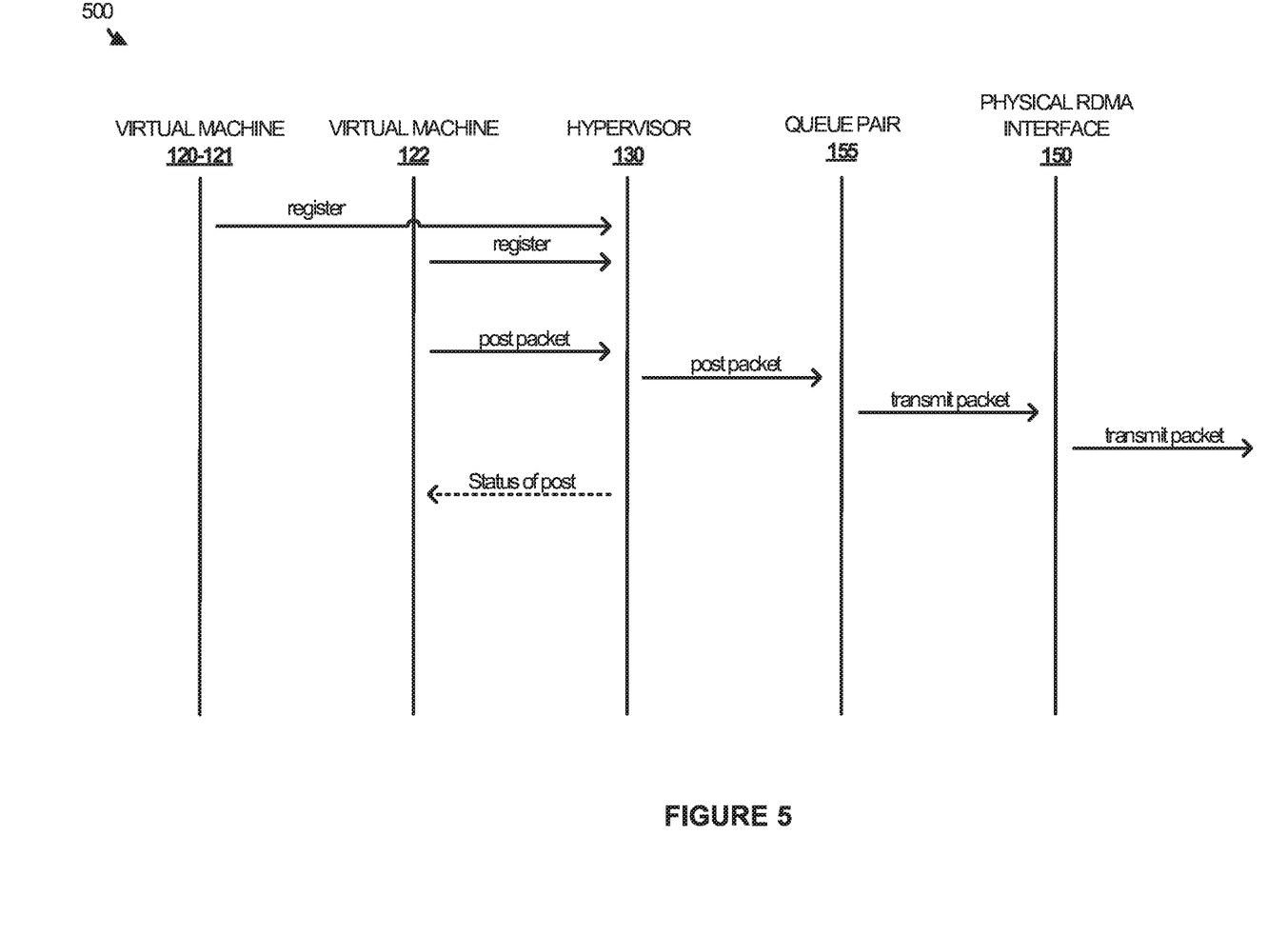
FIG. 5 illustrates a timing diagram for managing RDMA packets to be communicated over a physical RDMA interface according to an implementation.

FIG. 5 illustrates a timing diagram 500 for managing RDMA packets to be communicated over a physical RDMA interface according to an implementation. Timing diagram 500 includes systems and elements from computing environment 100 of FIG. 1. In particular, timing diagram 500 includes virtual machines 120-122, hypervisor 130, queue pair 155, and physical RDMA interface 150.

In operation, similar to the operations described in FIG. 4, virtual machines 120-122 register with hypervisor 130 to ensure that they can communicate via physical RDMA interface 150. To register, each of the virtual machines may provide hypervisor 130 with addressing information for the virtual machine, wherein the hypervisor may use the addressing information to forward and manage packets for each of the individual virtual machines. Here, once the virtual machines are registered with hypervisor 130, the virtual machines may transfer management packets or MADs to other computing nodes both physical and virtual. In particular, virtual machine 122 generates a management packet to be transferred to a second physical computing system. In response to hypervisor 130 identifying the generated packet from virtual machine 122, hypervisor 130 id posts the packet on queue pair 155. After being posted, the packet may be processed from queue pair 155 and transmitted to the second physical computing system via physical RDMA interface 150.

In addition to placing the packet on queue pair 155, hypervisor 130 may further be used to provide callback information to virtual machine 122. This callback information may be used to provide status information for the management packet as it is transmitted over physical RDMA interface. For example, once the packet is posted to queue pair 155 and transmitted over physical RDMA interface 150 a notification may be provided to virtual machine 122 indicating that the packet was successfully posted. In contrast, if the packet does fail to be transmitted a notification may be provided to virtual machine 122 indicating that the packet failed to be transmitted over the physical interface. The virtual machine may then process the notification to determine its next action (e.g. generate a new MAD, prepare data for communication, and the like).

Although demonstrated in the example of FIG. 5 as transferring a packet from a virtual machine to separate physical computing system, it should be understood that the VRDMA interface for each of the virtual machines may request and manage RDMA communications between virtual machines on the same host computing system. In particular, rather than posting packets to queue pair 155, hypervisor 130 may identify that the communication is requested between virtual machines of the host. As a result, rather than placing the packet in queue pair 155, the packet may instead be delivered to the VRDMA interface of the second virtual machine. For example, if virtual machine 120 transferred a RDMA management packet via VRDMA interface 140 to virtual machine 122, hypervisor 130 may be used to provide the packet to the corresponding VRDMA interface 142 for virtual machine 122. In this manner, the queue pair 155 and other resources associated with physical RDMA interface 150 are not required in the RDMA communication.

Figure 6:
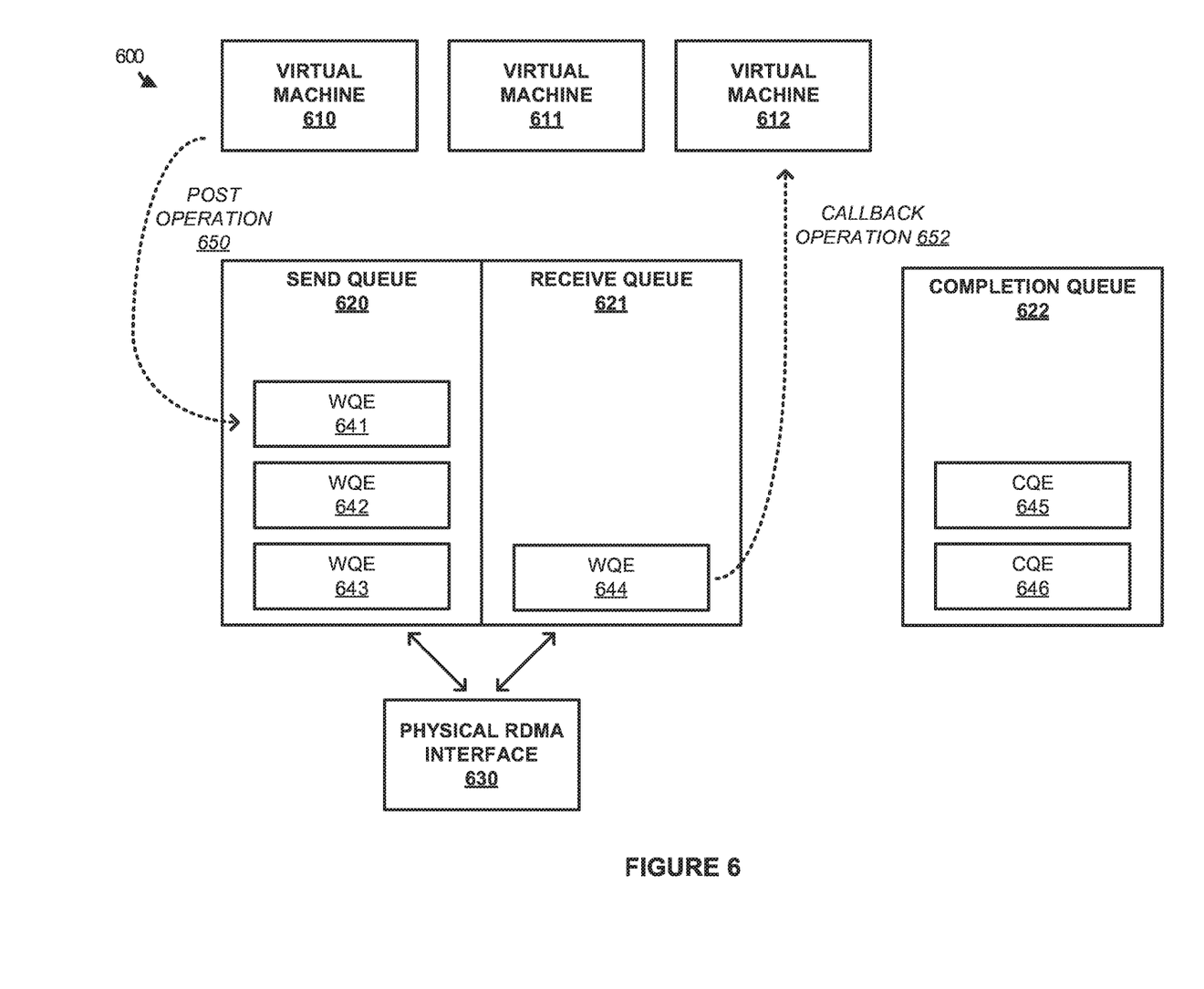
FIG. 6 illustrates an operational scenario of managing a queue pair for a physical RDMA interface according to an implementation.

FIG. 6 illustrates an operational scenario 600 of managing a queue pair for a physical RDMA interface according to an implementation. Operation scenario 600 includes virtual machines 610-612, queues 620-622, and physical RDMA interface 630. Send queue and receive queue 621 are representative of a GSI queue pair that is used in the management of RDMA connections between computing systems.

In the present implementation, send queue 620 includes work queue elements (WQEs) 641-643, receive queue 621 includes WQE 644, and completion queue 622 includes completion queue elements (CQEs) 645-646. As depicted, when a packet is required to be transmitted from a virtual machine to a destination on a second physical computing system, post operation 650 is implemented. In particular, a hypervisor for virtual machine 610 identifies that the packet is to be transferred to a second physical computing system, and posts the packet in the corresponding send queue 620 of the GSI queue pair. In identifying the packet, a driver within the virtual machine may identify that an RDMA packet is generated by a process or application of the virtual machine, and notify a RDMA manager operation in the hypervisor. Once notified, the RDMA manager may obtain the required packet and place the packet in the corresponding queue of the GSI queue pair. After being posted, the status of the packet may be monitored, and information about the status may be provided back to virtual machine 610. This status may include information about whether the transfer to the second computing system was successful, whether the transfer to the second computing system was unsuccessful, or some other similar status information for the packet. In this manner, the hypervisor may act as an intermediary to transparently transfer the packets over the physical interface, while providing status information to the virtual machine. This permits the virtual machine to manage its own queue pairs and other RDMA configuration information.

In addition to posting packets to the GSI queue pair, the hypervisor may further assist in providing callback operation 652 for packets received at physical RDMA interface 630. In particular, when GSI packets are obtained via physical RDMA interface 630, the packets may be placed in receive queue 621. Once placed in the receive queue, the hypervisor may identify the newly received packet and provide a callback to the associated virtual machine. Here, WQE 644 received at physical RDMA interface 630 is directed at virtual machine 612. In determining which virtual machine corresponds to a received packet, the hypervisor may perform packet inspection to identify a destination MAC address associated with the packet. Based on the destination MAC address the hypervisor may forward callback information to the corresponding virtual machine, permitting the virtual machine to process the packet as though it had been received locally at a VRDMA interface for the virtual machine.

Figure 7:
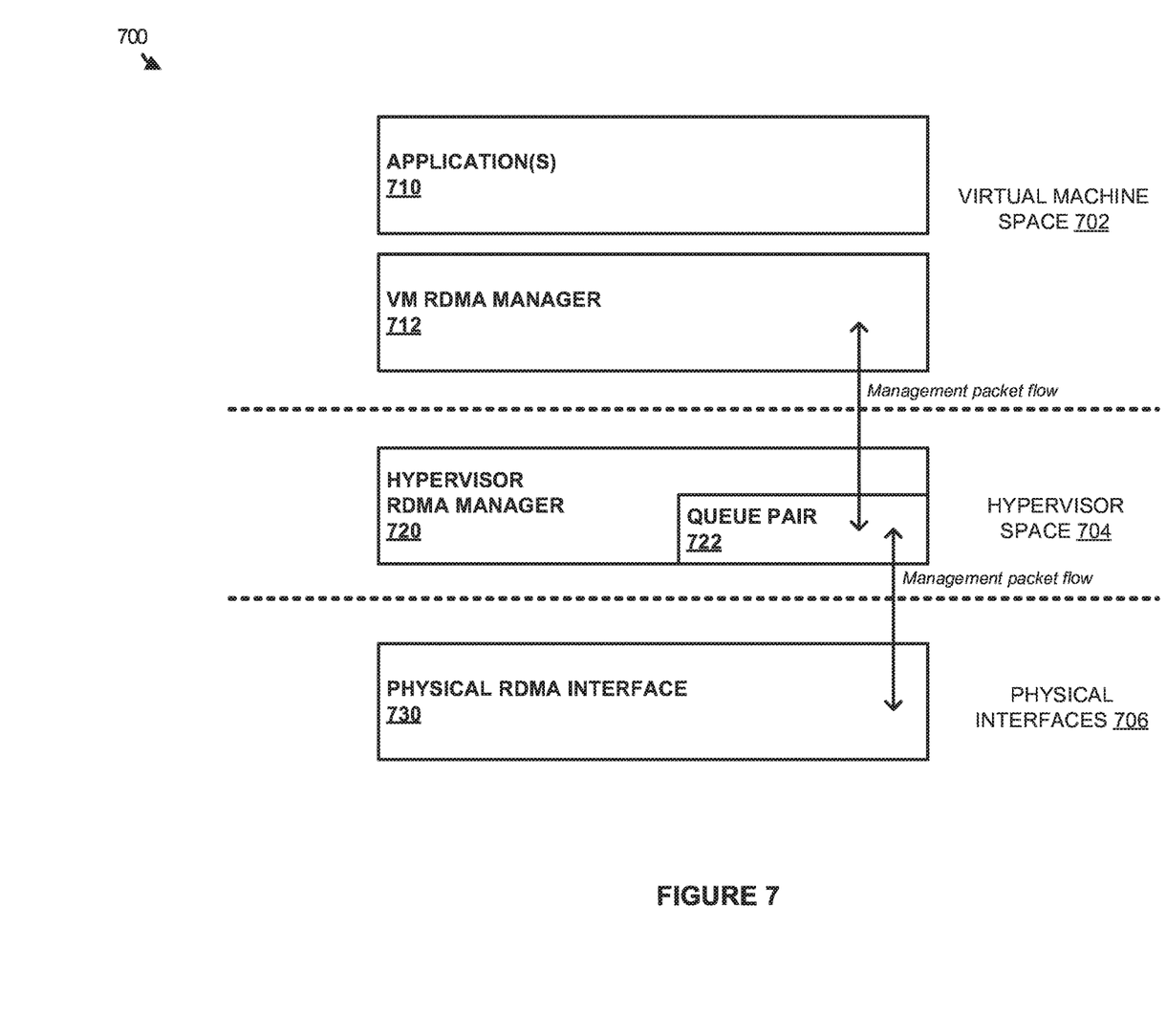
FIG. 7 illustrates an overview of RDMA packet management on a host computing system according to an implementation.

FIG. 7 illustrates an overview 700 of RDMA packet management on a host computing system according to an implementation. Overview 700 include virtual machine space 702, hypervisor space 704, and physical interfaces 730. Virtual machine space 702 includes applications 710 and virtual machine (VM) RDMA manager 712. Hypervisor space 704 includes hypervisor RDMA manager 720, which has access to queue pair 722. Physical interfaces 706 includes physical RDMA interface 730.

In operation, hypervisor RDMA manager 720 is configured to act as an intermediary between virtual machines and a physical RDMA interface. In particular as packets are received at physical RDMA interface 730 the packets may be placed in queue pair 722. Once identified by hypervisor RDMA manager 720, hypervisor RDMA manager 720 may identify a destination virtual machine based on the addressing attributes of the packet, and provide callback information to the virtual machine to process the packet locally using VM RDMA manager 712 as if the packet had been received at a VRDMA interface for the virtual machine. In some implementations, in providing the callback, a memory copy may be performed, wherein the packet in queue pair 722 may be copied into a queue pair of virtual machine space 702.

In addition to providing the packets to be processed within virtual machine space 702, VM RDMA manager 712 may also transfer management packets that require the use of queue pair 722. To provide the operation VM RDMA manager 712 may provide a notification to hypervisor RDMA manager 720 that a management packet is required to be transferred to another system. In response to identifying the packet, hypervisor RDMA manager may be responsible for identifying whether the packet is to be transferred to another physical computing system, and if it is to be transferred to another computing system, posting the packet in queue pair 722. In some implementations, this posting operation may include copying the packet to queue pair 722 from the queue pair in virtual machine space 702. Once added, hypervisor RDMA manager 720 may monitor the status of the packet and provide status information to VM RDMA manager 712. For example, if the packet was successfully transferred via physical RDMA interface 730, then a notification may be provided to VM RDMA manager 712. In this manner, VM RDMA manager 712 may be capable of monitoring the status of packets as they are transferred over physical RDMA interface 730, and may make any communication adjustments based on the status. Further, by the use of hypervisor RDMA manager 720, VM RDMA managers within the virtual machine may be capable of identifying and processing RDMA packets locally within the virtual machine.

Figure 8:
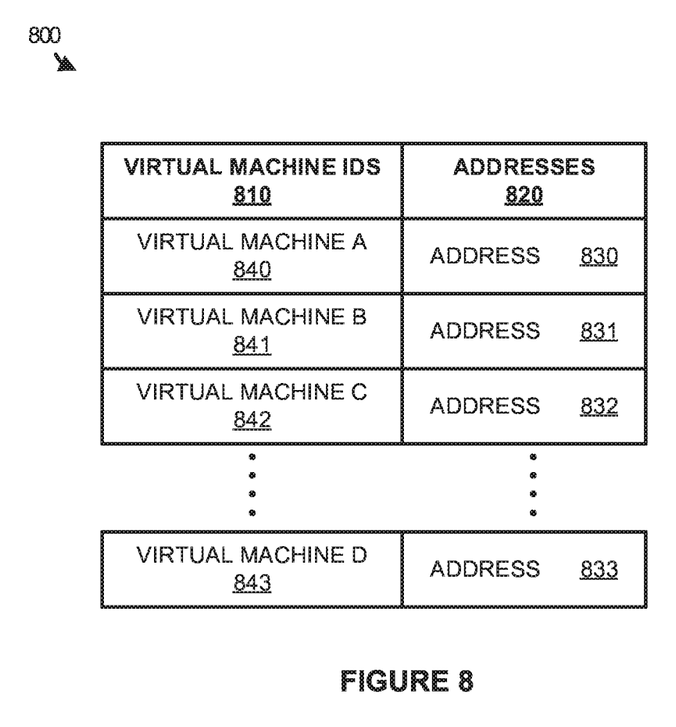
FIG. 8 illustrates a data structure to manage addressing information according to an implementation.

FIG. 8 illustrates a data structure 800 to manage addressing information according to an implementation. Data structure 800 includes columns for virtual machine identifiers (IDs) 810, and addresses 820. Although illustrated as a table in the present example it should be understood that one or more tables, trees, linked lists, and the like may be used in managing the addressing information for virtual machines.

As described herein, when virtual machines with RDMA capability are initiated on the host computing system, the virtual machines register with the hypervisor, permitting the virtual machines to access a GSI or some other management queue pair shared by the virtual machines of the host computing system. In these registrations, the virtual machines provide addressing information, such as a MAC address, that can be used to identify packets destined for the virtual machine and forward the packets as they are required. For example, when a packet is received on the GSI queue pair, the packet may be inspected and address 831 may be identified as the destination. Accordingly, the hypervisor may provide callback information to the virtual machine, permitting the virtual machine to process the packet as if it were received at a RDMA interface for the virtual machine.

Although not illustrated in the example of FIG. 8, it should be understood that when packets are to be transferred from each of the virtual machines, the data structure or structures may be used to maintain callback information for each of the packets. For example, if virtual machine C 842 were to post a packet for transfer to another host computing system, then the packet may be posted to the shared GSI queue pair and a callback may be associated with virtual machine C 842 in the data structure. Based on this callback, the virtual machine may receive status information for the packet indicating whether the packet was delivered, whether a failure occurred in delivering the packet, or some other similar status information in the communication of the packet.

Figure 9:
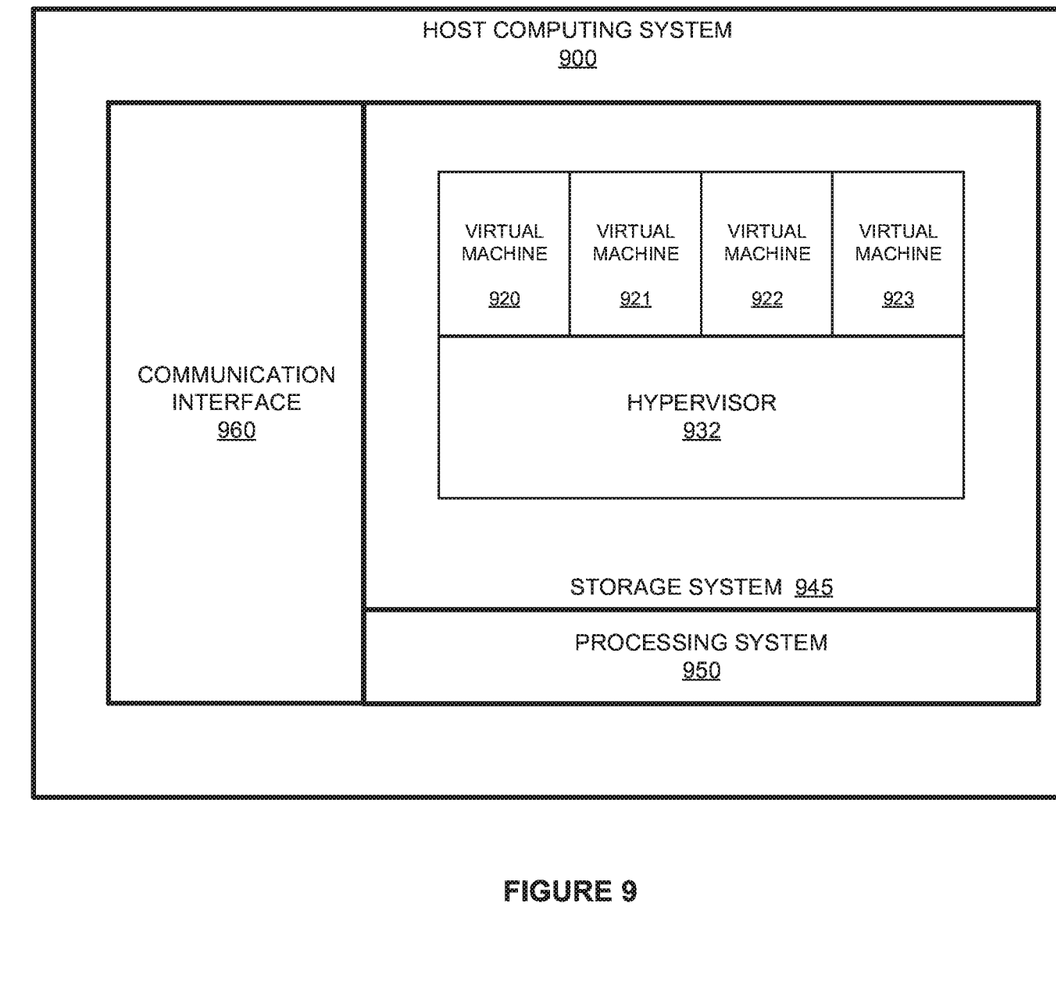
FIG. 9 illustrates a host computing system according to an implementation.

FIG. 9 illustrates a host computing system 900 according to an implementation. Host computing system 900 is representative of any computing system or systems with which the various operational architectures, processes, scenarios, and sequences disclosed herein for a host can be implemented. Host computing system 900 is an example of host 110 of FIG. 1, although other examples may exist. Host computing system 900 includes storage system 945, processing system 950, and communication interface 960. Processing system 950 is operatively linked to communication interface 960 and storage system 945. Communication interface 960 may be communicatively linked to storage system 945 in some implementations. Host computing system 900 may further include other components such as a battery and enclosure that are not shown for clarity.

Communication interface 960 comprises components that communicate over communication links to provide RDMA communications, wherein the components may include network cards, ports, processing circuitry and software, or some other communication components. The RDMA communications may use RDMA over Converged Ethernet (RoCE) in some implementations.

Processing system 950 comprises microprocessor and other circuitry that retrieves and executes operating software from storage system 945. Storage system 945 may include volatile and nonvolatile, removable and non-removable media implemented in any method or technology for storage of information, such as computer readable instructions, data structures, program modules, or other data. Storage system 945 may be implemented as a single storage device, but may also be implemented across multiple storage devices or sub-systems. Storage system 945 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 950 is typically mounted on a circuit board that may also hold the storage system. The operating software of storage system 945 comprises computer programs, firmware, or some other form of machine-readable program instructions. The operating software of storage system 945 comprises virtual machines 920-923 and hypervisor 932. The operating software on storage system 945 may further include an operating system, utilities, drivers, network interfaces, applications, or some other type of software. When read and executed by processing system 950 the operating software on storage system 945 directs host computing system 900 to operate as described herein.

In at least one implementation, hypervisor 932 provides a platform for virtual machines 920-923 to execute. In particular, hypervisor 932 may abstract physical components of the computing system and provide the abstracted components to the virtual machine, wherein the components may include processing system resources, storage resources, network resources, and the like. In the present implementation, hypervisor 932 is used to manage the connections and communications of each of the virtual machines over communication interface 960. In at least one example, each of the virtual machines with a VRDMA interface may register with hypervisor 932, wherein the registration includes an address associated with the virtual machine. Once the virtual machines are registered, the hypervisor may monitor a queue pair for communication interface 960 to identify data packets that are received on the queue pair. In some implementations, the queue pair comprises a GSI queue pair, wherein the GSI queue pair is used in managing and generating communication channels between computing systems.

When a packet is received, the hypervisor may inspect the packet to identify an address (and corresponding virtual machine) for the packet. Once the virtual machine is identified, a callback may be provided to the virtual machine, permitting the virtual machine to access and process the packet.

In addition to supporting packets received at the physical RDMA interface, hypervisor 932 may also be used in supporting packets to be transferred via the physical RDMA interface. In particular, hypervisor 932 may identify a packet to be placed in the queue pair from the virtual machine, and may post the packet on the queue pair for the physical RDMA interface. Hypervisor 932 may then monitor the status of the packet, and provide status information to the associated virtual machine. This status information may include information about whether a packet was successfully delivered, whether there was a failure in delivering the packet, or some other similar information. In some implementations, a service or driver on the virtual machine may identify the generation of management packets and forward the packets to the hypervisor for posting the packets.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of managing packets identified in a queue pair for a physical remote direct memory access (RDMA) interface of a host computing system, the method comprising:
    obtaining, in a hypervisor of the host computing system, one or more RDMA registrations each corresponding to a virtual machine running on the hypervisor of the host computing system, wherein each of the one or more RDMA registrations indicates at least one network address for the corresponding virtual machine;
    identifying a packet in a receive queue of the queue pair received at the physical RDMA interface;
    identifying that a destination network address for the packet corresponds to a virtual machine on the host computing system based on the one or more RDMA registrations; and
    in response to identifying that the destination network address corresponds to a virtual machine on the host computing system, providing a callback for the packet to the virtual machine, wherein the callback provides access to the packet in the virtual machine as if the packet were received at a virtual RDMA interface for the virtual machine.

2. The method of claim 1, wherein the queue pair comprises a General Services Interface (GSI) queue pair.

3. The method of claim 1, wherein the at least one network address comprises a media access control (MAC) address.

4. The method of claim 1, wherein the packet comprises a management datagram (MAD).

5. The method of claim 1 further comprising:
    identifying a second packet to be transmitted via the physical RDMA interface from a virtual machine of the host computing system to a second physical computing system; and
    posting the second packet in the queue pair.

6. The method of claim 5 further comprising:
    determining whether a transfer of the second packet from the physical RDMA interface was successful; and
    providing an indication to the virtual machine indicative of whether the transfer of the second packet from the physical RDMA interface was successful.

7. A host computing system comprising:
    one or more non-transitory computer readable storage media;
    a processing system operatively coupled to the one or more non-transitory computer readable storage media; and
    program instructions stored on the one or more non-transitory computer readable storage media to manage packets identified in a queue pair for a physical remote direct memory access (RDMA) interface of the host computing system that, when read and executed by the processing system, direct the processing system to at least:
        obtain one or more RDMA registrations each corresponding to a virtual machine running on the host computing system, wherein each of the one or more RDMA registrations indicates at least one network address for the corresponding virtual machine;
        identify a packet in a receive queue of the queue pair received at the physical RDMA interface;
        identify that a destination network address for the packet corresponds to a virtual machine on the host computing system based on the one or more RDMA registrations; and
        in response to identifying that the destination network address corresponds to a virtual machine on the host computing system, provide a call back for the packet to the virtual machine, wherein the callback provides access to the packet in the virtual machine as if the packet were received at a virtual RDMA interface for the virtual machine.

8. The host computing system of claim 7, wherein the queue pair comprises a General Service Interface (GSI) queue pair.

9. The apparatus of claim 8, wherein the packet comprises a management datagram (MAD).

10. The apparatus of claim 8, wherein the program instructions further direct the processing system to:
    identify a second packet to be transmitted via the physical RDMA interface from a virtual machine of the host computing system to a second physical computing system;
    post the second packet in the queue pair;
    determine whether a transfer of the second packet from the physical RDMA interface was successful; and
    provide an indication to the virtual machine indicative of whether the transfer of the second packet from the physical RDMA interface was successful.

11. The host computing system of claim 8, wherein the at least one network address comprises a media access control (MAC) address.

12. The host computing system of claim 7, wherein the packet comprises a management datagram (MAD).

13. The host computing system of claim 7, wherein the program instructions further direct the processing system to:
    identify a second packet to be transmitted via the physical RDMA interface from a virtual machine of the host computing system to a second physical computing system; and
    post the second packet in the queue pair.

14. The host computing system of claim 13, wherein the program instructions further direct the processing system to:
   determine whether a transfer of the second packet from the physical RDMA interface was successful; and
   provide an indication to the virtual machine indicative of whether the transfer of the second packet from the physical RDMA interface was successful.

15. The host computing system of claim 7, wherein identifying the packet in the queue pair received at the physical RDMA interface comprises identifying the packet in the queue pair received at the physical RDMA interface from a second host computing system executing one or more virtual machines.

16. An apparatus comprising:
   one or more non-transitory computer readable storage media; and
   program instructions stored on the one or more non-transitory computer readable storage media to manage packets identified in a queue pair for a physical remote direct memory access (RDMA) interface of a host computing system that, when read and executed by a processing system, direct the processing system to at least:
   obtain one or more RDMA registrations each corresponding to a virtual machine running on the host computing system, wherein each of the one or more RDMA registrations indicates at least one network address for the corresponding virtual machine;
   identify a packet in a receive queue of the queue pair received at the physical RDMA interface;
   identify that a destination network address for the packet corresponds to a virtual machine on the host computing system based on the one or more RDMA registrations; and
   in response to identifying that the destination network address corresponds to a virtual machine on the host computing system, provide a call back for the packet to the virtual machine, wherein the callback provides access to the packet in the virtual machine as if the packet were received at a virtual RDMA interface for the virtual machine.

17. The apparatus of claim 16, wherein the queue pair comprises a General Service Interface (GSI) queue pair.

18. The apparatus of claim 16, wherein the at least one network address comprises a media access control (MAC) address.

* * * * *